(12) United States Patent
Matsumoto et al.

(10) Patent No.: US 7,946,482 B2
(45) Date of Patent: May 24, 2011

(54) ELECTRONIC MONEY PAYING-IN SYSTEM

(75) Inventors: Naoto Matsumoto, Gunma (JP);
Yasunari Nakajima, Gunma (JP);
Tomonobu Kameda, Gunma (JP)

(73) Assignee: Sanden Corporation, Gunma (JP)

(*) Notice: Subject to any disclaimer, the term of this patent is extended or adjusted under 35 U.S.C. 154(b) by 413 days.

(21) Appl. No.: 12/279,378

(22) PCT Filed: Jan. 17, 2007

(86) PCT No.: PCT/JP2007/050572
§ 371 (c)(1),
(2), (4) Date: Aug. 14, 2008

(87) PCT Pub. No.: WO2007/094145
PCT Pub. Date: Aug. 23, 2007

(65) Prior Publication Data
US 2009/0095805 A1    Apr. 16, 2009

(30) Foreign Application Priority Data
Feb. 14, 2006    (JP) .................................. 2006-037069

(51) Int. Cl.
G06K 5/00    (2006.01)

(52) U.S. Cl. ......... 235/380; 235/492; 235/451; 235/487

(58) Field of Classification Search .................. 235/380, 235/492, 451, 487
See application file for complete search history.

(56) References Cited

U.S. PATENT DOCUMENTS

| 5,845,262 A * | 12/1998 | Nozue et al. ..................... 705/26 |
| 2002/0046186 A1 | 4/2002 | Nishio et al. |
| 2002/0052838 A1 * | 5/2002 | Yamada et al. ................. 705/39 |
| 2003/0163424 A1 * | 8/2003 | Kumamoto ..................... 705/41 |
| 2006/0081698 A1 * | 4/2006 | Yamagishi ..................... 235/379 |
| 2007/0271455 A1 * | 11/2007 | Nakano et al. ................. 713/154 |
| 2008/0230601 A1 * | 9/2008 | Suzuki et al. ................. 235/380 |

FOREIGN PATENT DOCUMENTS

| EP | 0907154 A2 | 4/1999 |
| EP | 1729250 A1 | 6/2006 |

(Continued)

OTHER PUBLICATIONS

International Search report dated Feb. 20, 2007 for PCT/JP2007/050572.

*Primary Examiner* — Edwyn Labaz
(74) *Attorney, Agent, or Firm* — Banner & Witcoff, Ltd.

(57) ABSTRACT

The present invention provides an electronic money paying-in system that can easily update information used for an electronic money paying-in process. As the present invention is provided with an electronic money management server for acquiring a paying-in amount that has been input to an electronic money charger and also sending a paying-in processing command for adding the paying-in amount to an electronic money balance on an IC card to the IC card via the electronic money charger, it needs to store information used for processing of depositing electronic money like the paying-in processing command only in the electronic money management server and it can easily update the information used for an electronic money paying-in process just by performing maintenance on the server. Therefore, as the information used for an electronic money paying-in process can be easily updated, maintenance operation can be easily performed on the electronic money charger.

9 Claims, 10 Drawing Sheets

FOREIGN PATENT DOCUMENTS

| | | |
|---|---|---|
| JP | 11-110461 A | 4/1999 |
| JP | 2000-149114 A | 5/2000 |
| JP | 2001-029626 A | 2/2001 |
| JP | 2002-166019 A | 6/2002 |
| JP | 2003-296646 A | 10/2003 |
| JP | 2004-005734 A | 1/2004 |
| JP | 2005-157497 A | 6/2005 |
| JP | 2005-242895 A | 9/2005 |
| JP | 2005-301737 A | 10/2005 |
| WO | WO 2005/083606 A1 | 9/2005 |

* cited by examiner

EXAMPLE OF DATA STRUCTURE OF PAYING-IN RECORDS

| USER ID | PAYING-IN AMOUNT | TRANSACTION DATE |
|---|---|---|
| 0123456 | 1,000 | 200x/mm/dd |
| 9876543 | 10,000 | 200x/mm/dd |
| 0101010 | 3,000 | 200x/mm/dd |
|  |  |  |

EXAMPLE OF DATA STRUCTURE OF PAYING-IN RECORDS

| SERVICE ID | USER ID | PAYING-IN AMOUNT | TRANSACTION DATE |
|---|---|---|---|
| 0002 | 0123456 | 1,000 | 200x/mm/dd |
| 0001 | 9876543 | -3,000 | 200x/mm/dd |
| 0002 | 0101010 | 3,000 | 200x/mm/dd |
| | | | |

Fig. 13

ELECTRONIC MONEY PAYING-IN SYSTEM

BACKGROUND OF THE INVENTION

1. Field of the Invention

The present invention relates to an electronic money paying-in system for adding a paying-in amount to an electronic money balance on an IC chip that stores the electronic money balance, which is used for paying for an electronic ticket, electronic settlement and the like.

2. Description of the Related Art

As the aforementioned type of an electronic money paying-in system, the system including an electronic money charger has been known (for example, see Patent Document 1). The electronic money charger is for sending deposit information, which is for adding a paying-in amount to an electronic money balance on an IC chip, to the IC chip, which stores the electronic money balance that is used in an electronic money service.

The electronic money charger known in the above-described system stores paying-in information, which is for adding a paying-in amount to an electronic money balance on an IC chip. The electronic money charger executes processing of depositing electronic money by sending the paying-in information to the IC chip.

In the above-described conventional example, however, information used for processing of depositing electronic money like the paying-in information is always stored in the electronic money charger. Thus, in the case of updating the information used for an electronic money paying-in process, maintenance needs to be carried out on each electronic money charger. That may complicate the whole maintenance operation.

Patent Document 1: Japanese Patent Publication 2005-301737

BRIEF SUMMARY OF THE INVENTION

The present invention is adapted in view of the above-described problem, and intends to provide an electronic money paying-in system that can easily update information used for an electronic money paying-in process.

In order to accomplish the above-described object, the present invention is an electronic money paying-in system including an electronic money charger that sends paying-in information to an IC chip that stores an electronic money balance, wherein the paying-in information is for adding a paying-in amount to the electronic money balance on the IC chip and the electronic money balance is used in an electronic money service, including a management server for acquiring the paying-in amount that has been input to said electronic money charger and also sending the paying-in information for adding the paying-in amount to the electronic money balance on the IC chip to the IC chip via the electronic money charger.

Accordingly, as the present invention needs to store such information used for an electronic money paying-in process like the paying-in information only in a predetermined management server, it can easily update the information used for an electronic money paying-in process just by performing maintenance on the predetermined server.

ADVANTAGES OF THE INVENTION

According to the present invention, information used for an electronic money paying-in process can be easily updated, thus, maintenance operation can be easily performed on an electronic money charger.

DESCRIPTION OF SYMBOLS

100 IC card
121c, 122c electronic money balance
200 electronic money charger
221 authentication information
222 image information
230 auxiliary storage unit
242 card issue button
260 money discriminating device
270 unlock detecting unit
280 card holding unit
300 image acquiring unit
500 electronic money management server
521 authentication information
522 command acquiring program

DETAILED DESCRIPTION OF THE INVENTION

Figure 1:
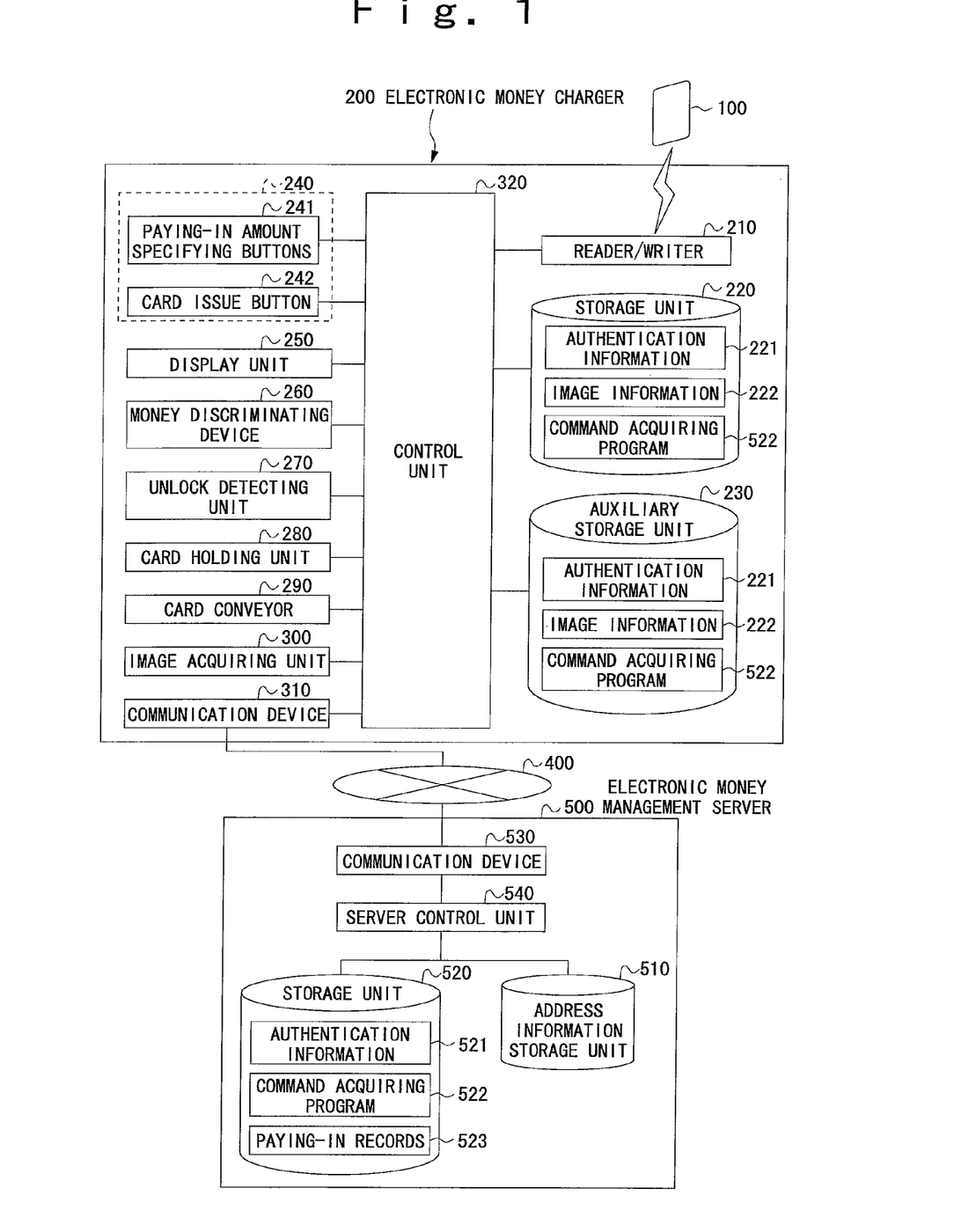
FIG. 1 is a functional block diagram of an electronic money paying-in system according to a first embodiment of the present invention.
Figure 2:
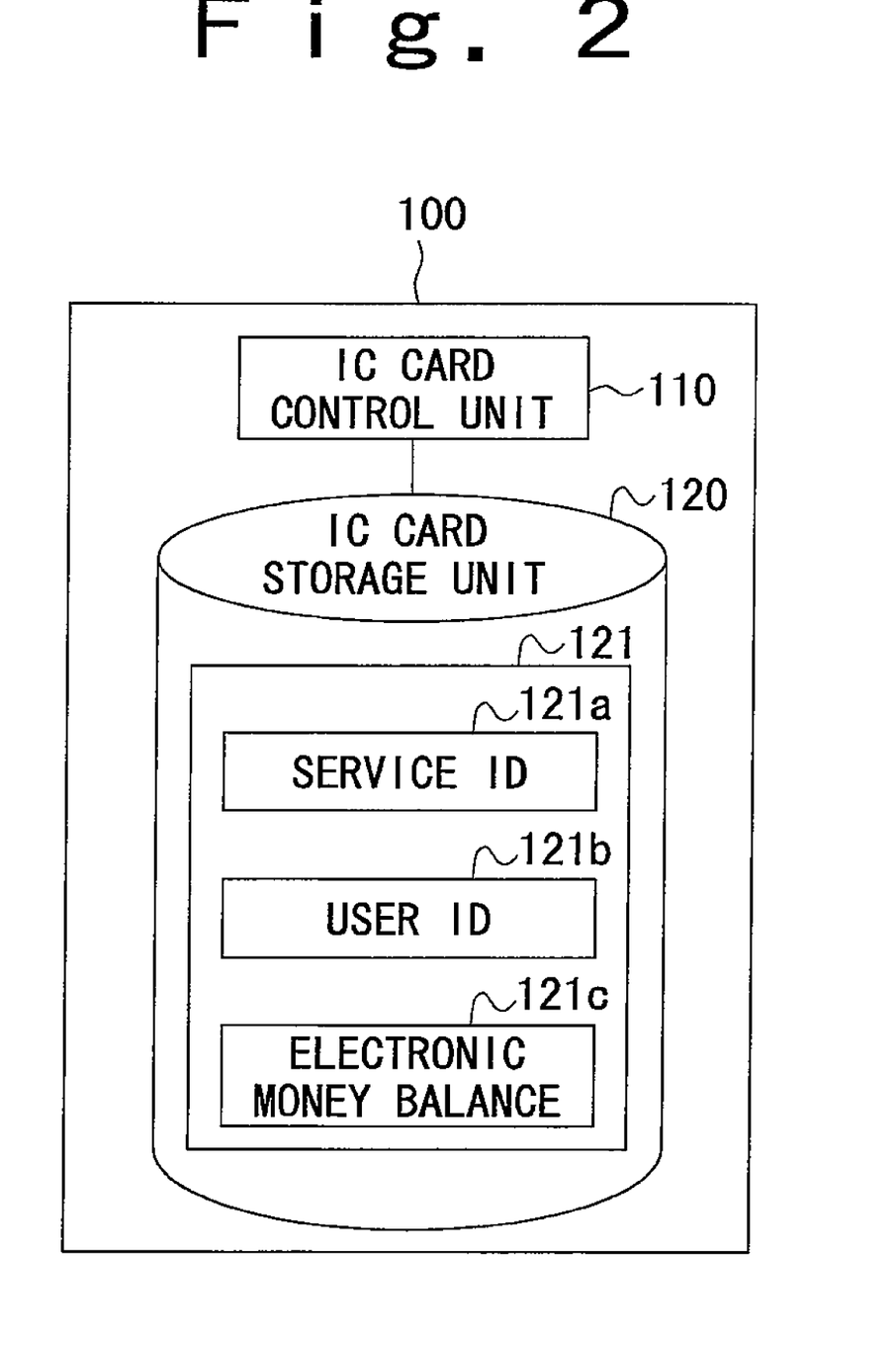
FIG. 2 is a functional block diagram of an IC card.
Figure 3:
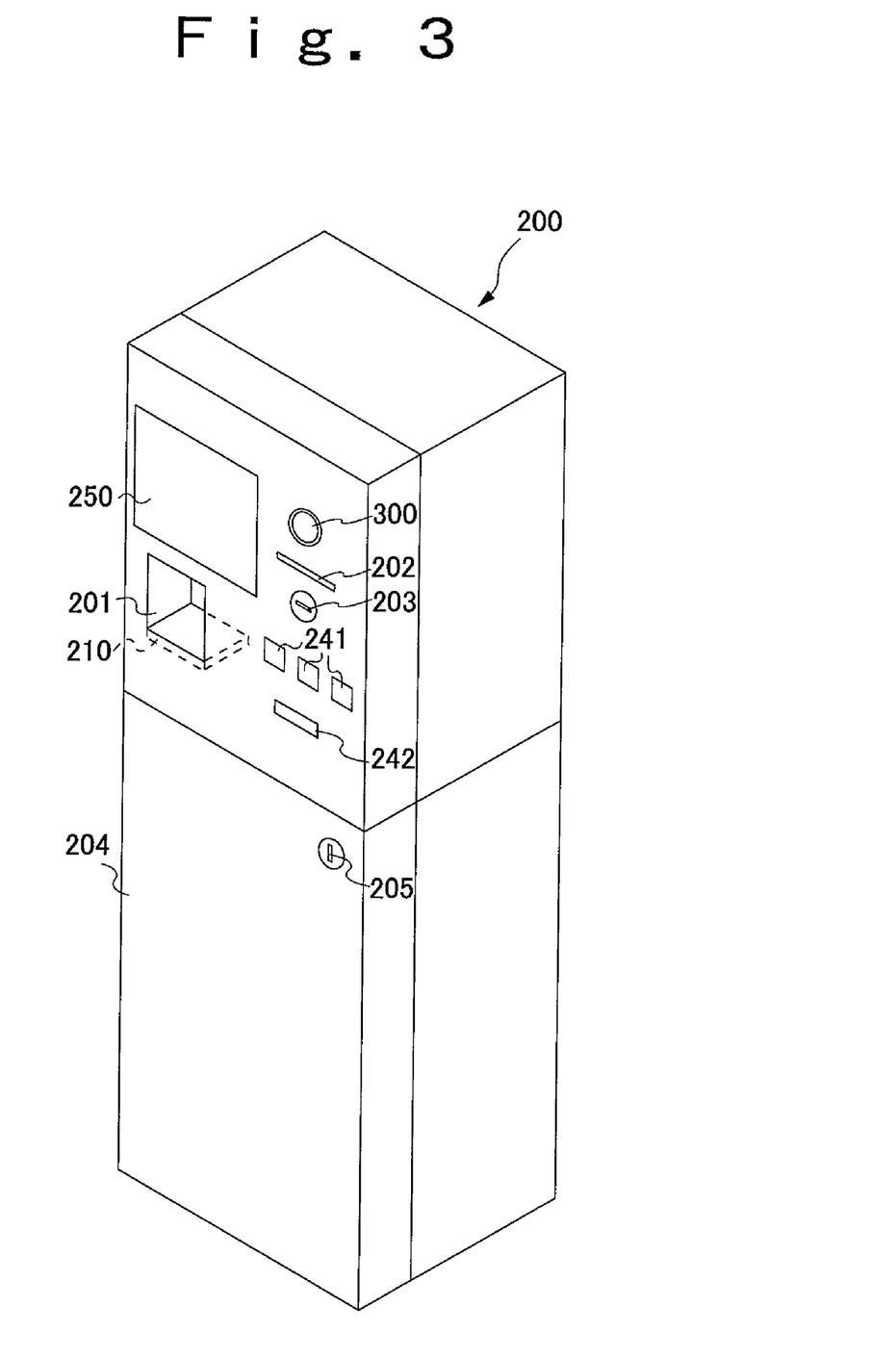
FIG. 3 is a perspective view of an electronic money charger.
Figure 4:
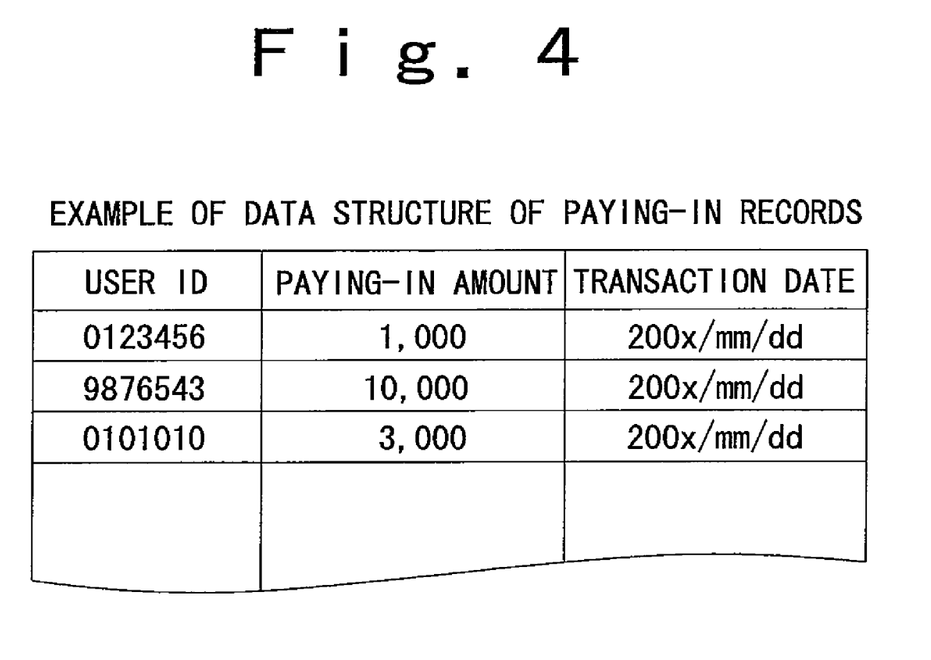
FIG. 4 is a diagram showing an exemplary data structure of paying-in records.
Figure 5:
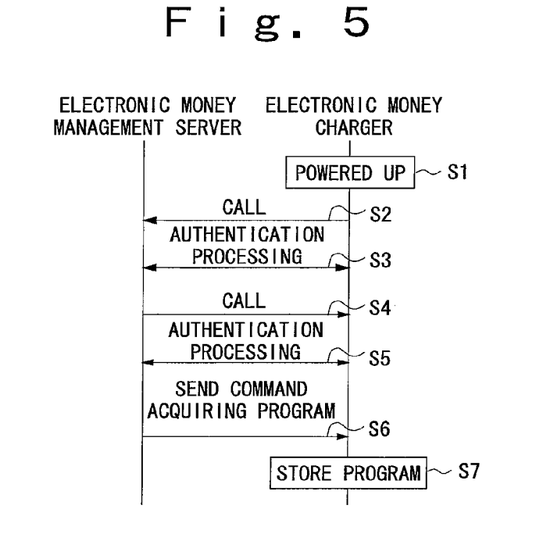
FIG. 5 is a sequence diagram for illustrating an operation of authentication processing.
Figure 6:
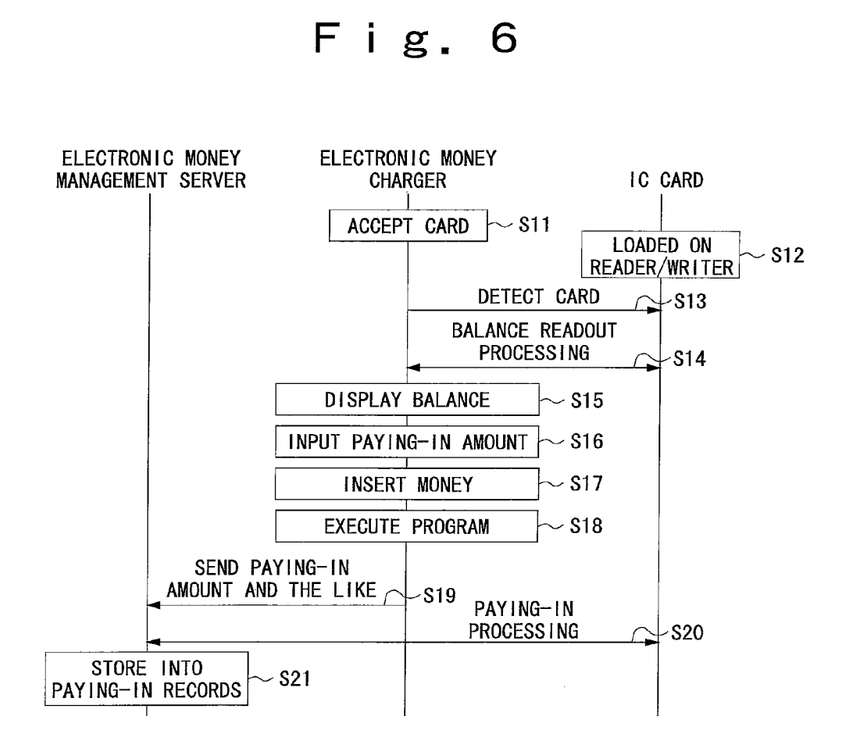
FIG. 6 is a sequence diagram for illustrating an operation of paying-in processing.
Figure 7:
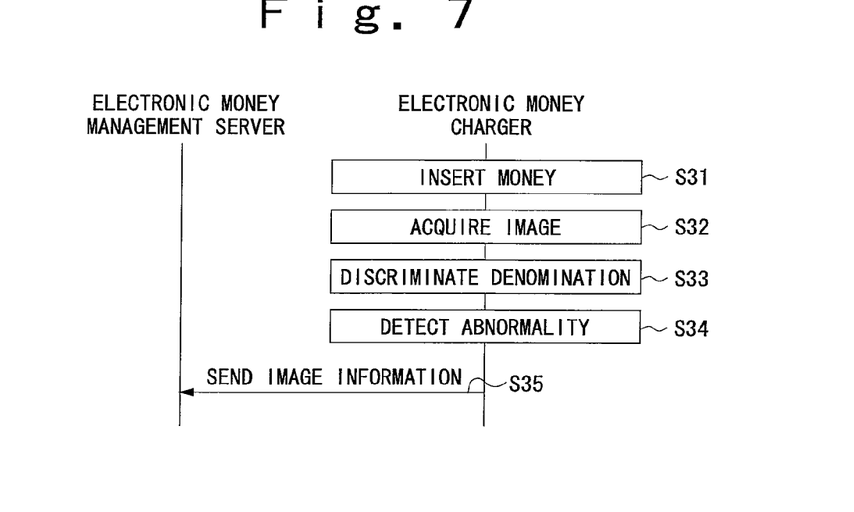
FIG. 7 is a sequence diagram for illustrating an operation of discrimination processing performed on inserted money.
Figure 8:
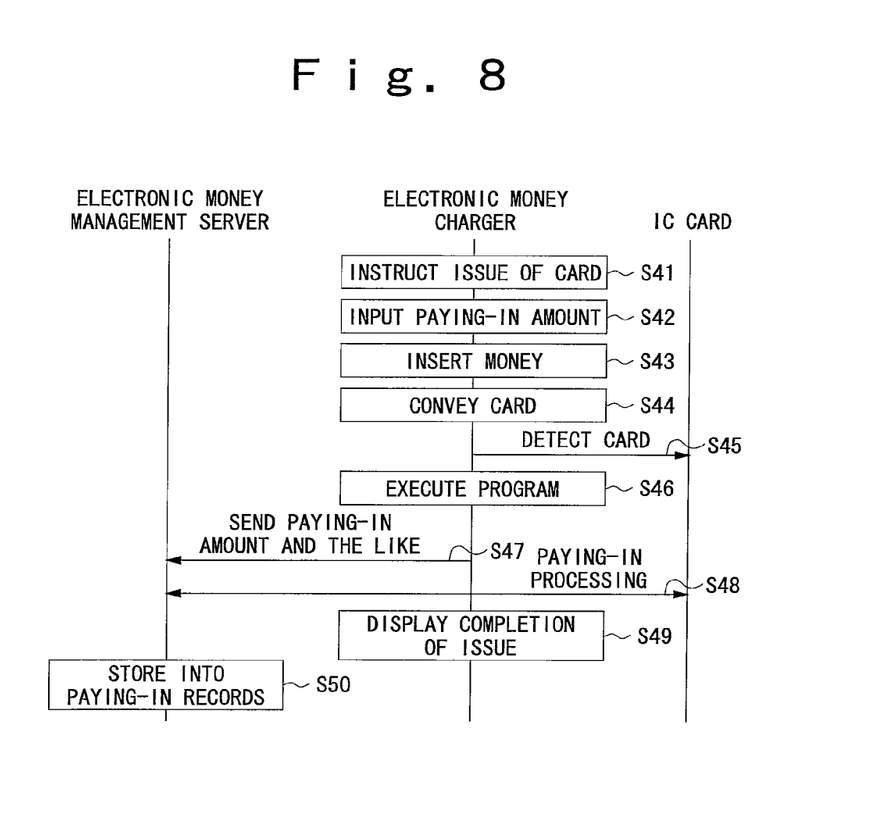
FIG. 8 is a sequence diagram for illustrating an operation of card issue processing.
Figure 9:
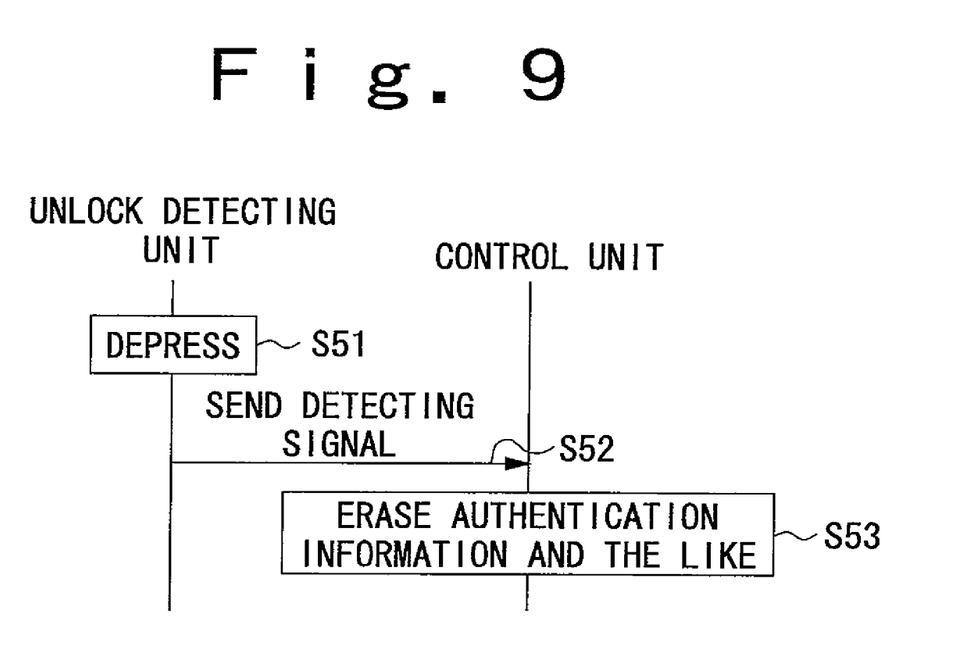
FIG. 9 is a sequence diagram for illustrating an operation performed in the case where fraudulent unlocking is detected.

FIGS. 1 to 9 show the first embodiment of the present invention. FIG. 1 is a functional block diagram of an electronic money paying-in system, FIG. 2 is a functional block diagram of an IC card, FIG. 3 is a perspective view of an electronic money charger, FIG. 4 is a diagram showing an exemplary data structure of paying-in records, FIG. 5 is a sequence diagram for illustrating an operation of authentication processing, FIG. 6 is a sequence diagram for illustrating an operation of paying-in processing, FIG. 7 is a sequence diagram for illustrating an operation of discrimination processing performed on inserted money, FIG. 8 is a sequence diagram for illustrating an operation of card issue processing, and FIG. 9 is a sequence diagram for illustrating an operation performed in the case where fraudulent unlocking is detected.

As shown in FIG. 1, the electronic money system includes an IC card 100 with an embedded IC chip for storing an electronic money balance; an electronic money charger 200 for sending a paying-in processing command to the IC card 100 as paying-in information for adding the paying-in amount to an electronic money balance on the IC card 100; and an electronic money management server 500 for sending the paying-in processing command that is generated on the basis of the paying-in amount that has been input to the electronic money charger 200 to the IC card 100 via a network 400 and the electronic money charger 200.

The IC card 100 has a coil antenna (not shown) for sending/receiving signals to/from a reader/writer 210 in the electronic money charger 200 to be described later; and an IC chip connected to the antenna embedded therein. As shown in FIG. 2, the IC chip is provided with an IC card control unit 110 for controlling the circuit of the IC chip; and IC card storage unit 120 for storing various types of information. The IC card storage unit 120 has a region laid out for each service which involves the IC card 100. In the region for the electronic money service, a service ID 121a for identifying a service; a user ID 121b for identifying a service user; and an electronic money balance 121c are stored. When the IC card control unit 110 receives a readout processing command for reading out the electronic money balance 121c via the antenna, it sends the service ID 121a, the user ID 121b and the electronic money balance 121c from the IC card storage unit 120 via the antenna. When the IC card control unit 110 receives a paying-in processing command for adding the paying-in amount to the electronic money balance 121c, it adds the paying-in amount included in the paying-in processing command to the electronic money balance 121c in the IC card storage unit 120. In the embodiment, the paying-in processing command is used as the paying-in information described in the claims.

The electronic money charger 200 includes a card loader 201 with a window in front; a bill insert window 202 to receive an inserted bill; a coin insert window 203 to receive an inserted coin; an outside door 204 provided on the front surface of the electronic money charger 200; a cylinder lock 205 for locking the outside door 204; the reader/writer 210 for reading/writing data from/to the IC card 100; storage unit 220 and auxiliary storage unit 230 for storing various types of information; an inputting unit 240 for inputting what specified by the user; a display unit 250 for displaying various types of information; a money discriminating device 260 for judging validity and discriminating denomination of the inserted money; an unlock detecting unit 270 for detecting fraudulent unlocking of the cylinder lock 205; a card holding unit 280 for holding the IC card 100 that stores the electronic money balance 121c; a card conveyor 290 for conveying the IC card 100 held in the card holding unit 280 to the reader/writer 210; an image acquiring unit 300 as image acquiring means for acquiring an image of the user by picking the image of the user; a communication device 310 for connecting the electronic money charger 200 to a network 400; and a control unit 320 for controlling the aforementioned components.

The reader/writer 210, which is provided at the lower part of the card loader 201, sends/receives a command or data to/from the IC card 100 loaded on the card loader 201. The reader/writer 210 is provided with an antenna for communicating with the IC card 100 in a contactless manner.

Both of the storage unit 220 and the auxiliary storage unit 230 are rewritable storage elements such as the EEPROM. The storage unit 220 and the auxiliary storage unit 230 store authentication information 221 that stores an encryption key required in authentication processing performed with the electronic money management server 500; charger identification information; a password and the like. Each of the storage unit 220 and 230 stores image information 222 acquired by the image acquiring unit 300 to be described later; and command acquiring program 522 received from the electronic money management server 500.

The inputting unit 240 is composed of a plurality of paying-in amount specifying buttons 241; and a card issue button 242 as issue instruction means for instructing issue of the IC card 100. Different amounts such as "1,000 yen" and "3,000 yen" are assigned to the paying-in amount specifying buttons 241, respectively. When a paying-in amount specifying button 241 is depressed, the amount corresponding to the button is input as the paying-in amount.

The display unit 250, which is made of a liquid crystal display, displays the electronic money balance 121c of the IC card 100 or the amount of inserted money. The money discriminating device 260 discriminates validity and denomination of the bills inserted into the bill insert window 202 and coins inserted into the coin insert window 203. When the money discriminating device 260 has recognized validity of the inserted money, it accepts the inserted money.

The unlock detecting unit 270, which is a known switch, is provided inside the cylinder lock 205. The unlock detecting unit 270 is adapted to be depressed in the case where the cylinder lock 205 is unlocked by a false lock such as a picking tool or the like. If the unlock detecting unit 270 is depressed, it sends a predetermined detecting signal to the control unit 320.

The card holding unit 280, which has a known configuration for holding a plurality of the IC cards 100, is adapted to draw the IC cards 100 one by one and convey the drawn IC card 100 to the card conveyor 290 by dropping it thereon. The electronic money balance 121c of each IC card 100 held in the card holding unit 280 does not store the amount of money.

The card conveyor 290, which has an endless belt and a known drive mechanism, conveys the IC card 100 conveyed out from the card holding unit 280 to the card loader 201 by loading the IC card 100 onto the circumference of the belt and rotating the belt by means of the known drive mechanism (not shown).

The image acquiring unit 300 is a known camera and provided on the front surface of the electronic money charger 200. The image acquiring unit 300 is set to pick an image in front of the electronic money charger 200 for a predetermined range. The image acquiring unit 300 acquires an image of the user by picking an image within the predetermined range. The acquired image of the user is stored in the storage unit 220 and the auxiliary storage unit 230 as image information 222.

The communication device 310 is communication equipment such a modem for connecting the electronic money charger 200 to the network 400. In the embodiment, a public telephone network is used for the network 400, and a modem corresponding thereto is used as the communication device 310.

The control unit 320, which has a ROM unit, a RAM unit as well as a CPU and the like, performs the authentication processing performed with the electronic money management server 500, paying-in processing of electronic money, issue processing of the IC card 100, and the like. Specific procedures of the processing will be described in detail later. The ROM of the control unit 320 stores the readout processing command. The control unit 320 can read out the electronic money balance 121c of the IC card 100 by sending the readout processing command to the IC card 100.

The electronic money management server 500 has address information storage unit 510 for storing address information of each electronic money charger 200; storage unit 520 for storing various types of information; communication device 530 for connecting the electronic money management server 500 to the network 400; and a server control unit 540 for controlling the aforementioned components. The address information storage unit 510 stores the charger identification information and the address information of the electronic money charger 200. In the embodiment, a telephone number is used as the address information. The storage unit 520 stores authentication information 521 that stores an encryption key for performing encrypted communication with the electronic money charger 200, the charger identification information, a password and the like required in authentication performed with the electronic money depository 100; the command acquiring program 522 for executing request-to-send of the paying-in processing command to the electronic money management server 500; and paying-in records 523 including the user ID 121b of the IC card 100 to which electronic money is deposited, the paying-in amount electronic money, and the transaction date as shown in FIG. 4.

Now, an operation related to the authentication processing performed by the electronic money paying-in system will be described with reference to the sequence diagram shown in FIG. 5. First, when the electronic money charger 200 is powered up (step S1), the control unit 320 of the electronic money charger 200 calls the electronic money management server 500 via the communication device 310 (step S2), and establishes connection between the electronic money charger 200 and the electronic money management server 500. The communication path between the electronic money charger 200 and the electronic money management server 500 is encrypted by encryption keys for the respective authentication information 221 and 521 stored in the charger 200 and the server 500. Then, the control unit 320 performs the authentication processing with the electronic money management server 500 on the established encrypted communication path (step S3). In this authentication processing, the authentication information 221 of the electronic money charger 200 and the authentication information 521 of the electronic money management server 500 are used respectively.

Next, the server control unit 540 of the electronic money management server 500 acquires the address information of the electronic money charger 200 from the address information storage unit 510, and calls back to the acquired address (in the embodiment, a telephone number) (step S4). The communication path for this call back is also encrypted. Then, the authentication processing is performed in the same manner as at step S3 (step S5). Upon completion of all the authentication processing through the aforementioned processing flow, the server control unit 540 sends the command acquiring program 522 stored in the storage unit 520 of the electronic money management server 500 to the electronic money charger 200 (step S6). Then, the control unit 320 of the electronic money charger 200 stores the command acquiring program 522 received from the electronic money management server 500 into the storage unit 220 and the auxiliary storage unit 230 (step S7). If the authentication processing at step S3 or S5 failed, the server control unit 540 does not send the command acquiring program 522.

Although it has not been described above, the control unit 320 of the electronic money charger 200 erases the command acquiring program 522 stored in the storage unit 220 and the auxiliary storage unit 230 when the power supply to the electronic money charger 200 is to be turned off.

If the control unit 320 of the electronic money charger 200 cannot receive the command acquiring program 522 from the electronic money management server 500 due to failure of the authentication processing at step S3 or S5 or abnormality or the like occurred to the network 400, it only performs readout of the electronic money balance 121c from the IC card 100. In this case, when the IC card 100 is loaded on the card loader 201, the control unit 320 of the electronic money charger 200 sends the readout processing command to the IC card 100, and also displays the electronic money balance 121c received from the IC card 100 on the display unit 250.

Now, an operation related to the paying-in processing performed by the electronic money paying-in system will be described with reference to the sequence diagram shown in FIG. 6. In the embodiment, the paying-in processing can be performed only in the case where the authentication processing between the electronic money charger 200 and the management server 500 succeeded. First, the control unit 320 of the electronic money charger 200 controls the display unit 250 to display a message for guiding the user to load the IC card 100 on the card loader 201 (step S1). In this state, the control unit 320 controls the reader/writer 210 to send a predetermined answer request signal to the IC card 100 until an answer signal is received from the IC card 100 via the reader/writer 210. In the embodiment, a card ID unique to the IC card 100 (not shown) is used as the answer signal. When the user loads the IC card 100 on the card loader 201 (step S12), the IC card control unit 110 of the IC card 100 sends the answer signal in response to the answer request signal received from the reader/writer 210.

The control unit 320 detects the IC card 100 (step S13) by receiving the answer signal from the IC card 100, and performs balance readout processing of electronic money with the IC card 100 (step S14). Specifically, the IC card control unit 110 sends the service ID 121a, the user ID 121b, and the electronic money balance 121c in the IC card storage unit 120 to the reader/writer 210 in response to the readout processing command received from the control unit 320 of the electronic money charger 200 via the reader/writer 210. Then, the control unit 320 displays the electronic money balance 121c received from the IC card 100 on the display unit 250 (step S15).

When the paying-in amount is input by means of the paying-in amount specifying buttons 241 (step S16), the control unit 320 displays a message for requesting the user to insert money by the input paying-in amount on the display unit 250. When money corresponding to the paying-in amount is inserted into the bill insert window 202 or the coin insert window 203 (step S17), the control unit 320 executes the command acquiring program 522 stored in the storage unit 220 (step S18). Specific procedure of the processing performed at step S17 will be described in detail later.

Next, the control unit 320 executes request-to-send the paying-in processing command to the electronic money management server 500 by executing the command acquiring program 522. Specifically, the control unit 320 sends the user ID 121b and the electronic money balance 121c received from the IC card 100 at step S14 and the paying-in amount input at step S16 to the electronic money management server 500 via the communication device 310 and the network 400 (step S19). When the server control unit 540 of the electronic money management server 500 receives the paying-in amount, the user ID 121b and the electronic money balance 121c from the electronic money charger 200 via the communication device 530, it performs paying-in processing of the electronic money with the IC card 100 (step S20).

Now, the paying-in processing of the electronic money will be specifically described. First, the server control unit 540 generates the paying-in processing command so as to include the received paying-in amount, and sends the paying-in processing command to the electronic money charger 200 via the communication device 530 and the network 400. Next, the control unit 320 of the electronic money charger 200 sends the paying-in processing command received from the electronic money management server 500 to the IC card 100 via the reader/writer 210. When the IC card control unit 110 of the IC card 100 receives the paying-in processing command from the electronic money charger 200, it adds the paying-in amount included in the command to the electronic money balance 121*c*. After completing the addition to the electronic money balance 121*c*, the IC card control unit 110 sends an answer signal that indicates the completion of the addition to the electronic money charger 200. As the server control unit 540 of the electronic money management server 500 receives the answer signal sent by the control unit 320 of the electronic money charger 200, the paying-in processing of the electronic money has completed.

After completing the paying-in processing of the electronic money, the server control unit 540 of the electronic money management server 500 stores information including the paying-in amount and the user ID 121*b* received from the electronic money charger 200 at step S19 and the transaction date associated with each other into the paying-in records 523 in the storage unit 520 (step S21).

Although it has not been described above, when the control unit 320 of the electronic money charger 200 detects abnormality in the storage unit 220, i.e., when it cannot read out the authentication information 221 and the command acquiring program 522 in the storage unit 220 owing to damage or the like to the storage unit 220, it performs the aforementioned authentication processing with the electronic money management server 500 by using the authentication information 221 stored in the auxiliary storage unit 230, and also performs the paying-in processing at step S20 by using the command acquiring program 522 stored in the auxiliary storage unit 230.

Now, an operation related to the discrimination processing performed on inserted money which has not been described above will be described with reference to the sequence diagram shown in FIG. 7. First, when money is inserted into a window as at step S17 (step S31), the money discriminating device 260 sends a money detecting signal that indicates that money is inserted in the window to the control unit 320. When the control unit 320 receives the money detecting signal, it controls the image acquiring unit 300 to acquire an image (step S32), and stores the acquired image in the image information 222 in the storage unit 220 and the auxiliary storage unit 230.

Then, the money discriminating device 260 judges validity and discriminates denomination of the inserted money (step S33). When the inserted money is judged valid, the money discriminating device 260 accepts the inserted money and sends amount information on the inserted money to the control unit 320. If the money discriminating device 260 detects abnormality in the inserted money when counterfeit money is inserted (step S34), it sends a counterfeit money detecting signal that indicates that counterfeit money is detected to the control unit 320. When the control unit 320 receives the counterfeit money detecting signal, it sends the image information 222 in the storage unit 220 to the electronic money management server 500 (step S35), and omits the processing at step S18 and after.

Now, an operation related to the issue processing of the IC card 100 will be described with reference to the sequence diagram shown in FIG. 8. In the embodiment, the issue processing of the IC card 100 can be performed only in the case where the authentication processing between the electronic money charger 200 and the management server 500 succeeded. First, when a card issue instruction is performed by means of the card issue button 242 (step S41), and then the paying-in amount is input by means of the respective paying-in amount specifying buttons 241 (step S42), the control unit 320 displays a message for requesting the user to insert money by the input paying-in amount on the display unit 250. When money corresponding to the paying-in amount is inserted into the bill insert window 202 or the coin insert window 203 (step S43), the control unit 320 controls the card holding unit 280 to draw the IC card 100 and also controls the card conveyor 290 to convey the drawn IC card 100 to the card loader 201 (step S44). The processing performed at step S43 is the same as the aforementioned discrimination processing performed on the inserted money. If the money discriminating device 260 detects abnormality in the inserted money, the control unit 320 omits the processing at step S44 and after. In the embodiment, as the IC card 100 is conveyed to the card loader 201 by means of the card conveyor 290, the IC card 100 is ejected outside.

After detecting the IC card 100 conveyed onto the card loader 201 by controlling the reader/writer 210 to send the answer request signal (step S45), the control unit 320 sends the readout processing command to the IC card 100. Then, the control unit 320 executes the command acquiring program 522 (step S46) to send the user ID 121*b* and the electronic money balance 121*c* of the IC card 100 as well as the paying-in amount to the electronic money management server 500 (step S47). The server control unit 540 of the electronic money management server 500 receives the user ID 121*b*, the electronic money balance 121*c* and the paying-in amount from the electronic money charger 200, and then performs the paying-in processing with the IC card 100 via the electronic money charger 200 (step S48). The processing performed at step S48 is the same as that performed at step 20.

Then, the control unit 320 displays a message that indicates that the issue of the IC card 100 has completed on the display unit 250 (step S49). After completing the paying-in processing of the electronic money, the server control unit 540 of the electronic money management server 500 stores information including the paying-in amount and the user ID 121*b* received from the electronic money charger 200 and the transaction date associated with each other into the paying-in records 523 in the storage unit 520 (step S50).

Now, an operation performed in the case where fraudulent unlocking on the cylinder lock 205 is detected in the electronic money charger 200 will be described with reference to the sequence diagram shown in FIG. 9. First, when the cylinder lock 205 is unlocked by a picking tool or the like and the unlock detecting unit 270 is depressed (step S51), the unlock detecting unit sends an unlock detecting signal to the control unit 320 (step S52). When the control unit 320 receives the unlock detecting signal, it detects abnormality, i.e., that picking manipulation is being conducted, and then erases the authentication information 221 and the command acquiring program 522 which has been stored into the storage unit 220 and the auxiliary storage unit 230 after the detection (step S53).

As described above, according to the electronic money paying-in system of the embodiment, the electronic money management server 500 that acquires the paying-in amount input to the electronic money charger 200 and sends the paying-in processing command for adding the paying-in amount to the electronic money balance 121*c* of the IC card 100 to the IC card 100 via the electronic money charger 200 is provided. That allows information used for paying-in processing of electronic money such as the paying-in processing command to be only stored in the electronic money management server 500 so that such information used for paying-in processing of electronic money can be updated just by maintenance performed on the electronic money management server 500. Accordingly, as the information used for paying-in processing of the electronic money can be easily updated, the whole maintenance operation of the electronic money charger 200 can be easily performed.

The electronic money charger 200, which has the money discriminating device 260 for discriminating denomination of the inserted money, sends the image information 222 to the electronic money management server 500 in the case where the money discriminating device 260 detects abnormality in the inserted money. Thus, in the case where counterfeit money is detected, the electronic money charger 200 can send the image of the user who inserted the money to the electronic money management server 500. That enables the electronic money management server 500 to perform centralized supervision to detect an offense.

When the electronic money charger 200 is powered up, the electronic money management server 500 performs the authentication processing with the electronic money charger 200 by using the authentication information 521. On condition that the electronic money charger 200 is authenticated, the electronic money management server 500 sends the paying-in processing command to the IC card 100. That means that the paying-in processing of the electronic money can be performed only in the case where the authentication processing succeeded. That can firmly protect the system against any fraudulent deposit of electronic money.

The electronic money management server 500 sends the command acquiring program 522 to the electronic money charger 200 on the condition that it has authenticated the electronic money charger 200, and sends the paying-in processing command to the IC card 100 on the condition that the electronic money charger 200 is executing the command acquiring program 522. That means that the electronic money management server 500 can perform the paying-in processing only in the case where the electronic money charger 200 has succeeded the authentication processing and then executes the command acquiring program 522. That can much firmly protect the system against any fraudulent deposit of the electronic money.

The electronic money charger 200 erases the command acquiring program 522 when the power supply thereto is to be turned off. Thus, the command acquiring program 522 cannot be read out, i.e., cannot be executed while the power supply to the electronic money charger 200 stops. That can firmly protect the system against any fraudulent deposit of electronic money.

The electronic money charger 200, which has the storage unit 220 for storing the authentication information 221 and the command acquiring program 522, erases the authentication information 221 and the command acquiring program 522 stored in the storage unit 220 if fraudulent unlocking of the cylinder lock 205 is detected. That blocks any leakage of the authentication information 221 and the command acquiring program 522 to outside. That can firmly protect the system against a masquerade as the electronic money charger 200 by using the authentication information 221 and a fraudulent deposit of electronic money by using the command acquiring program 522.

The electronic money charger 200, which has the auxiliary storage unit 230 for storing the authentication information 221 and the command acquiring program 522, executes the command acquiring program 522 stored in the auxiliary storage unit 230 and performs the authentication processing with the electronic money management server 500 by using the authentication information 221 stored in the auxiliary storage unit 230, if it detects abnormality in the storage unit 220. Thus, in the case where the electronic money charger 200 cannot read out the authentication information 221 and the command acquiring program 522 in the storage unit 220 owing to damage or the like to the storage unit 220, it can use the authentication information 221 and the command acquiring program 522 stored in the auxiliary storage unit 230. That ensures stable operation of the electronic money charger 200.

If the electronic money charger 200 cannot receive the paying-in processing command from the electronic money management server 500, it only performs readout of the electronic money balance 121$c$ from the IC card 100. Thus, even in the case where deposit of the electronic money is disabled due to abnormality occurred to the network 400, failure of the authentication processing between the electronic money charger 200 and the electronic money management server 500 or the like, it can read out the electronic money balance 121$c$ of the IC card 100. That makes the system more convenient to users.

The electronic money charger 200, which has the card issue button 242 for instructing issue of the IC card 100 with an IC chip for storing the electronic money balance 121$c$ and the card holding unit 280 for holding the card 100, sends the paying-in processing command received from the electronic money management server 500 to the IC card 100 drawn from the card holding unit 280 and ejects the IC card 100 to outside when the card issue instruction is performed by means of the card issue button 242. Accordingly, the electronic money charger 200 can newly issue the IC card 100 that stores the electronic money balance 121$c$. That makes the system more convenient to users who want the IC card 100.

The electronic money charger 200, which has the money discriminating device 260 for discriminating denomination of the inserted money, sends the image information 222 to the electronic money management server 500 in the case where the money discriminating device 260 detects abnormality in the inserted money. Thus, in the case where counterfeit money is detected, the electronic money charger 200 can send the image of the user who inserted the money to the electronic money management server 500. That enables the electronic money management server 500 to perform centralized supervision to detect an offense.

The electronic money charger 200, which has the image acquiring unit 300 for acquiring an image of the user by picking the image of the user, sends the image information 222 acquired by the image acquiring unit 300 to the electronic money management server 500. Thus, if the inserted money is counterfeit, the electronic money charger 200 can send the image information 222 of the user who inserted the money to the electronic money management server 500. That enables the electronic money management server 500 to perform centralized supervision to detect an offense.

The electronic money paying-in system according to a second embodiment of the present invention will be described below. The second embodiment differs from the first embodiment in that it has an IC card 100 for storing the electronic money balance for a plurality of electronic money services to enable the electronic money balance to be transferred between the plurality of electronic money services. Accordingly, the electronic money paying-in system can perform paying-in processing by using the electronic money as well as cash. As configurations and operations of the second embodiment other than the aforementioned ones are the same as those of the first embodiment, only the different points will be described here.

Figure 10:
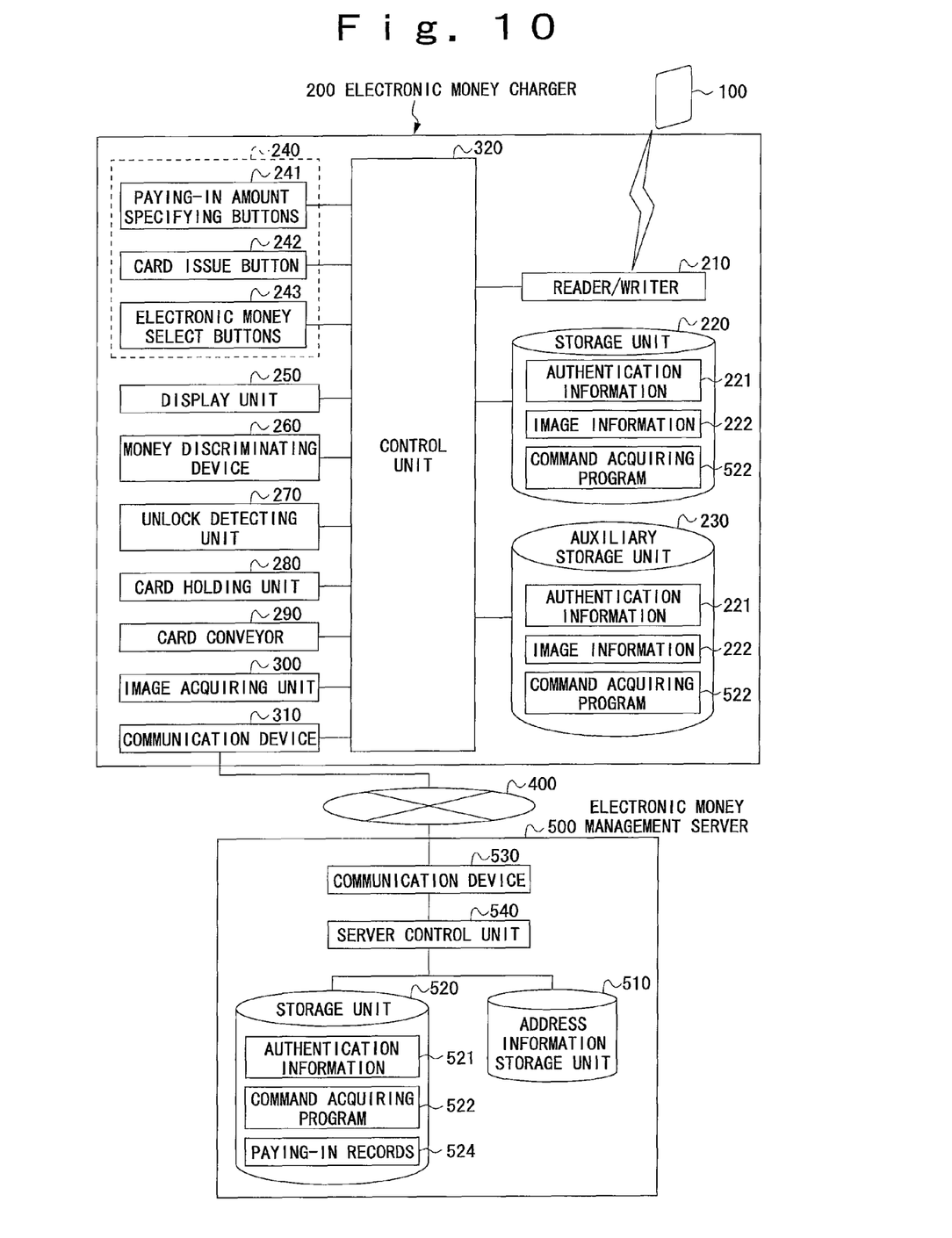
FIG. 10 is a functional block diagram of an electronic money paying-in system according to a second embodiment of the present invention.

An inputting unit 240 of an electronic money charger 200 according to the embodiment is provided with a plurality of electronic money select buttons 243 as shown in FIG. 10. Different service IDs 121$a$, 122$a$ for the electronic money services are assigned to the electronic money select buttons 243. When an electronic money select button 243 is depressed, the service ID 121*a* or 122*a* for the electronic money service corresponding to the button is input.

Figure 11:
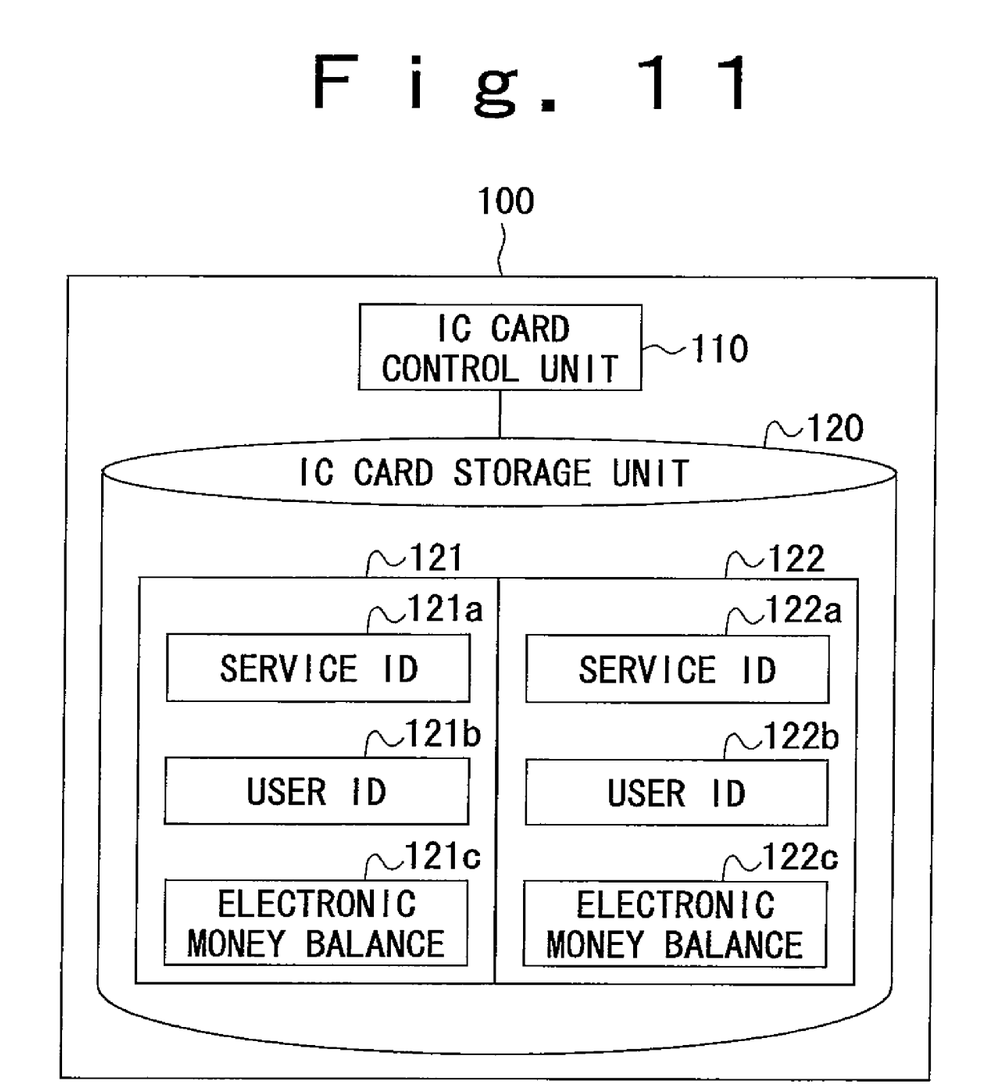
FIG. 11 is a functional block diagram of an IC card.

IC card storage unit 120 of the IC card 100 according to the embodiment is provided with a region 121 for an electronic money service A and a region 122 for an electronic money service B as shown in FIG. 11. The region 121 for the electronic money service A stores the service ID 121*a*, the user ID 121*b*, and the electronic money balance 121*c* for the electronic money service A. The region 122 for the electronic money service B stores the service ID 122*a*, the user ID 122*b*, and the electronic money balance 122*c* for the electronic money service B. In the embodiment, the service ID 121*a* for the electronic money service A is "0001" and the service ID 122*a* for the electronic money service B is "0002".

Figure 12:
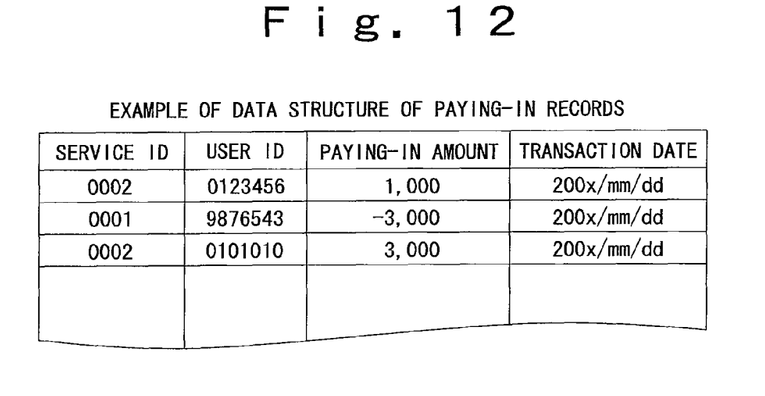
FIG. 12 is a diagram showing an exemplary data structure of paying-in records.

An electronic money management server 500 according to the embodiment is adapted to manage a plurality of electronic money services. The electronic money management server 500 stores paying-in records 524 as shown in FIG. 12 in storage unit 520 therein. The paying-in records includes the service IDs 121*a* and 122*a*, the user IDs 121*b* and 122*b* of the electronic money services in which the electronic money has been deposited or drawn, the paying-in amount of the electronic money, and the transaction date.

Figure 13:
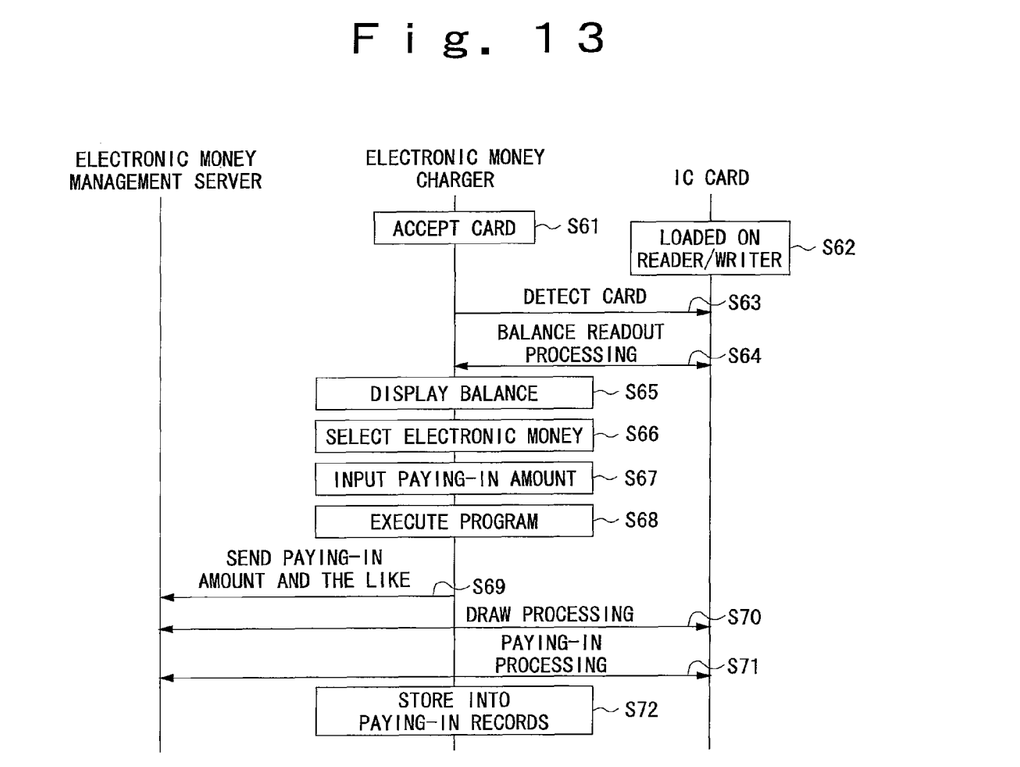
FIG. 13 is a sequence diagram for illustrating an operation of electronic money conversion processing.

Now, an operation related to the paying-in processing performed by the electronic money paying-in system according to the embodiment will be described with reference to the sequence diagram shown in FIG. 13. Here, the case where the paying-in processing is performed from the electronic money balance 121*c* for the electronic money service A to the electronic money balance 122*c* for the electronic money service B is taken as an example. The procedures of the processing performed from step S61 to step S63 in the sequence diagram shown in FIG. 13 are the same as those performed from step S11 to step S13 in the sequence diagram shown in FIG. 6.

After detecting the IC card 100, a control unit 320 performs balance readout processing of the electronic money with the IC card 100 (step S64). Specifically, the control unit 320 sends a readout processing command for all of the electronic money services stored in the IC card 100. In response to the readout processing command received from the electronic money charger 200, the IC card control unit 110 sends the service ID 121*a*, the user ID 121*b*, and the electronic money balance 121*c* for the electronic money service A, and the service ID 122*a*, the user ID 122*b*, and the electronic money balance 122*c* for the electronic money service B in the IC card storage unit 120 to the reader/writer 210. Then, the control unit 320 displays the electronic money balance 121*c* for the electronic money service A and the electronic money balance 122*c* for the electronic money service B received from the IC card 100 on a display unit 250 (step S65).

Next, the control unit 320 makes the user to select the electronic money service in which the user is to deposit or draw money (step S66). Specifically, the control unit 320 controls the display unit 250 to display a message for requesting the user to select the electronic money service in which the user is to draw money. After the service ID for the electronic money service in which the user is to draw money is input by means of the electronic money select buttons 243, the control unit 320 controls the display unit 250 to display a message for requesting the user to select the electronic money service in which the user is to deposit money. After the service ID for the electronic money service in which the user is to deposit money is input by means of the electronic money select buttons 243, the paying-in amount is input by means of a paying-in amount specifying buttons 241 (step S67), and the control unit 320 executes the command acquiring program 522 in storage unit 220 (step S68). Here, "0001" is input as the service ID for the electronic money service in which the user is to draw money, and "0002" is input as the service ID for the electronic money service in which the user is to deposit money.

Next, by executing the command acquiring program 522, the control unit 320 sends the service ID 121*a*, the user ID 121*b*, and the electronic money balance 121*c* for the electronic money service A; the service ID 122*a*, the user ID 122*b*, and the electronic money balance 122*c* for the electronic money service B; and the paying-in amount to the electronic money management server 500 (step S69). In turn, the server control unit 540 of the electronic money management server 500 performs the draw processing for the previously received electronic money service (step S70). Specifically, the server control unit 540 generates the paying-in processing command so as to specify the service ID for the electronic money service in which the user is to draw money (for example, "0001") and include the received paying-in amount as the draw amount. The term "draw amount" here refers to the paying-in amount put into negative. When the paying-in amount is "3,000", the draw amount is "−3,000". Then, the server control unit 540 sends the paying-in processing command to the electronic money charger 200 via a communication device 530 and a network 400. Next, the control unit 320 of the electronic money charger 200 sends the paying-in processing command received from the electronic money management server 500 to the IC card 100 via the reader/writer 210. When the IC card control unit 110 of the IC card 100 receives the paying-in processing command from the electronic money charger 200, it adds the draw amount to the electronic money balance 121*c* in the region 121 that stores the service ID 121*a* specified by the command. In other words, the paying-in amount is subtracted from the electronic money balance 121*c* for the electronic money service A. Next, the IC card control unit 110 sends an answer signal that indicates the completion of the addition to the electronic money charger 200. As the server control unit 540 of the electronic money management server 500 receives the answer signal sent by the control unit 320 of the electronic money charger 200, the draw processing of the electronic money has completed.

Next, the server control unit 540 of the electronic money management server 500 performs the paying-in processing for the electronic money service which is received later at step S69 (electronic money service B) (step S71). In this case, the server control unit 540 generates the paying-in processing command so as to specify the service ID for the electronic money service in which the user is to deposit money (for example, "0002") and include the received paying-in amount, and sends the command to the IC card 100 via the electronic money charger 200. When the IC card control unit 110 of the IC card 100 receives the paying-in processing command from the electronic money charger 200, it adds the paying-in amount to the electronic money balance 122*c* in the region 122 that stores the service ID 122*a* specified by the command. Then, after completing the addition to the electronic money balance 121*c*, the IC card control unit 110 sends the answer signal that indicates the completion of the addition to the electronic money charger 200. As the server control unit 540 of the electronic money management server 500 receives the answer signal sent by the control unit 320 of the electronic money charger 200, the paying-in processing of the electronic money has completed.

After completing the paying-in processing of the electronic money, the server control unit 540 of the electronic money management server 500 stores information including the service ID 121*a*, the user ID 121*b*, the draw amount, and the transaction date for the electronic money service in which the draw processing has been performed (electronic money service A) associated with each other, and information including the service ID 122a, the user ID 122b, the paying-in amount, and the transaction date for the electronic money service in which the paying-in processing has been performed (electronic money service B) associated with each other into the paying-in records 524 in the storage unit 520 (step S72).

As described above, according to the electronic money paying-in system of the embodiment, the IC card 100 has an IC chip for storing the electronic money balances 121c and 122c for a plurality of services, and the management server 500 sends a command to the IC card 100 via the electronic money charger 200 where the command is to subtract the paying-in amount input at the electronic money charger 200 from the electronic money balance 121c of a service stored in the IC card (electronic money service A) and add the paying-in amount to the electronic money balance 122c of another service (electronic money service B). That enables the electronic money paying-in processing to be performed between the electronic money services A and B stored in the IC card 100. Accordingly, the user can deposit the electronic money even if the user is not bringing any cash. That makes the system more convenient to users.

Although the aforementioned embodiments have been described by the examples in which the electronic money charger 200 stores the command acquiring program 522 received from the management server 500 in the storage unit 220 and the auxiliary storage unit 230, the command acquiring program 522 may be stored in the RAM of the control unit 320. In such a case, as the command acquiring program 522 is not stored in the electronic money charger 200 while the power supply to the electronic money charger 200 stops, nobody can deposit the electronic money to the IC card 100 even by stealing the electronic money charger 200. That can firmly protect the system against any fraudulent deposit of electronic money.

Although the paying-in processing is performed with cash or the electronic money balance of an electronic money service in the aforementioned embodiments, the paying-in processing may be performed to the IC card with an account number of a financial organization, an identification number of a credit card or the like. In such a case, the account number of the financial organization, the identification number of the credit card or the like is stored in the IC card.

Although it has not been described in the aforementioned embodiments, the authentication processing may be performed between the IC card 100 and the electronic money management server 500 with an authentication key that is stored in both of the IC card 100 and the electronic money management server 500 so that the paying-in processing is enabled only in the case where the authentication processing has succeeded.

The invention claimed is:

1. An electronic money paying-in system comprising:
an electronic money charger that sends paying-in information to an IC chip that stores an electronic money balance, wherein the paying-in information is for adding a paying-in amount to the electronic money balance on the IC chip and the electronic money balance is used in an electronic money service, and;
a management server for acquiring the paying-in amount that has been input to said electronic money charger and also sending the paying-in information for adding the paying-in amount to the electronic money balance on the IC chip to the IC chip via the electronic money charger;

said management server being configured to perform predetermined authentication processing with the electronic money charger by using predetermined authentication information, and responsive to said management server authentication of the electronic money charger, the management server sends a predetermined program to the electronic money charger, such that the electronic money charger is configured to execute said program so that the management server sends the paying-in information for the IC chip;
said electronic money charger having a storage means for storing said authentication information and said program, the electronic money charger being configured to detect a predetermined abnormality, and responsive thereto, so as to erase the authentication information and the program from the storage means.

2. The electronic money paying-in system according to claim 1, wherein
said electronic money charger erases said program when the power supply thereto is to be turned off.

3. The electronic money paying-in system according to claim 1, wherein
said electronic money charger stores said program in volatile memory.

4. The electronic money paying-in system according to claim 1, wherein
said electronic money charger, which has auxiliary storage means for storing said authentication information and said program, executes the program stored in the auxiliary storage means if the electronic money charger detects abnormality in the storage means, and performs the authentication processing with the management server by using the authentication information stored in the auxiliary storage means.

5. The electronic money paying-in system according to claim 1, wherein
said electronic money charger only performs readout of the electronic money balance on the IC chip if the electronic money charger cannot receive the paying-in information from the management server.

6. The electronic money paying-in system according to claim 1, wherein
said electronic money charger, which has issue instruction input means for instructing issue of a card with said IC chip and a card holding unit for holding said card, sends the paying-in information received from the management server to the card drawn from the card holding unit and ejects the card to outside when a card issue instruction is performed by means of the issue instruction means.

7. The electronic money paying-in system according to claim 1, wherein said electronic money charger, which has a money discriminating device for discriminating denomination of inserted money, sends predetermined abnormality information to the management server if the money discriminating device detects abnormality in the inserted money.

8. The electronic money paying-in system according to claim 1, wherein
said electronic money charger, which has image acquiring means for acquiring an image of a user by picking the image of the user, sends the image of the user acquired by the image acquiring means to the management server.

9. The electronic money paying-in system according to claim 1, wherein
said IC chip stores the electronic money balances for a plurality of services, and the management server sends paying-in information to the IC chip via the electronic money charger wherein the paying-in information is for subtracting the paying-in amount that has been input at the electronic money charger from the electronic money balance of a service stored in the IC chip and adding the paying-in amount to the electronic money balance of another service stored in the IC chip.

* * * * *